US007419090B2

(12) United States Patent
Sawa

(10) Patent No.: US 7,419,090 B2
(45) Date of Patent: Sep. 2, 2008

(54) METHOD AND SYSTEM FOR AUTOMATIC TELLER MACHINE CASH MANAGEMENT

(75) Inventor: Tsutomu Sawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/041,351

(22) Filed: Jan. 24, 2005

(65) Prior Publication Data

US 2005/0173515 A1 Aug. 11, 2005

(51) Int. Cl.
*G06F 17/60* (2006.01)

(52) U.S. Cl. ....................................... 235/379; 235/380

(58) Field of Classification Search ................. 235/379, 235/380, 375, 486; 705/43, 35; 902/8, 12, 902/13, 38
See application file for complete search history.

(56) References Cited

U.S. PATENT DOCUMENTS

| | | | | |
|---|---|---|---|---|
| 5,012,075 | A * | 4/1991 | Hutchison et al. | 235/379 |
| 5,253,167 | A * | 10/1993 | Yoshida et al. | 705/43 |
| 5,900,607 | A * | 5/1999 | Awatsu et al. | 235/379 |
| 6,508,397 | B1 * | 1/2003 | Do | 235/379 |
| 6,823,995 | B2 | 11/2004 | Mukai | 209/534 |
| 6,976,634 | B2 * | 12/2005 | Washington et al. | 235/486 |
| 7,000,778 | B2 * | 2/2006 | Omori et al. | 209/534 |

FOREIGN PATENT DOCUMENTS

| | | |
|---|---|---|
| JP | 03-136190 | 6/1991 |
| JP | 03-271888 | 12/1991 |
| JP | 033182242 | 12/1991 |
| JP | 05-266299 | 10/1993 |
| JP | 06-215232 | 5/1994 |
| JP | 06120611 | 5/1994 |
| JP | 08-263725 | 10/1996 |
| JP | 09263333 | 9/1997 |
| JP | 10-241017 | 9/1998 |
| JP | 2001187610 | 6/2001 |

* cited by examiner

*Primary Examiner*—Daniel St. Cyr
(74) *Attorney, Agent, or Firm*—Thomas D. Fortneberry; Cynthia S. Byrd; Biggers & Ohanian, LLP

(57) ABSTRACT

A management apparatus associated detachably with a cash cassette is provided for managing the cash cassette storing bills or coins for transactions with users at an automatic teller machine. The cash cassette includes an error information recording area for recording a type of error in the event of occurrence of the error, and a count information recording area for recording the number of bills or coins expected to be in the cash cassette. Based on the information acquired from the error information recording area, the management apparatus determines whether a predetermined type of error has occurred. When determining that such a type of error has occurred, the management apparatus outputs an instruction to management staff to count the number of bills or coins in the cash cassette, or when determining that such a type of error has not occurred, it outputs information from the count information recording area.

8 Claims, 9 Drawing Sheets

FIG.3A

210

| ERROR INFORMATION RECORDING AREA (CIPHER A) | | | | | |
|---|---|---|---|---|---|
| ERROR CODE | DATE AND TIME OF OCCURRENCE | MACHINE'S SERIAL NUMBER | PART IDENTIFICATION INFORMATION | REPAIR REQUIRING FLAG | PREVENTIVE MAINTENANCE FLAG |
| E1234 | X/Y/Z (YR/MO/DY) A:B (AM/PM) | SN1001 | PN5655 | NOT REQUIRED | NOT REQUIRED |
| E3456 | A/B/C (YR/MO/DY) X:Y (AM/PM) | SN2123 | PN3423 | NOT REQUIRED | REQUIRED |
| ⋮ | ⋮ | ⋮ | ⋮ | ⋮ | ⋮ |

FIG.3B

200

| COUNT INFORMATION RECORDING AREA | | |
|---|---|---|
| CASH COUNTER | COUNT OF CASH ENTERED (CIPHER B) | A |
| | COUNT OF CASH DISPENSED (CIPHER B) | B |
| | COUNT OF CASH IN CASSETTE (CIPHER A) | C |
| | COUNT OF CASH IN REJECT BIN (CIPHER A) | D |
| STATISTICAL COUNTER (CIPHER A) | TOTAL COUNT OF CASH TRANSACTED | E |
| | TOTAL COUNT OF CASH DISPENSED | F |
| | TOTAL COUNT OF CASH ENTERED | G |
| | COUNT OF ERRORS | H |
| | COUNT OF RETRIES | I |

FIG.4A

230

| OPEN/CLOSE INFORMATION RECORDING AREA (CIPHER A) | |
|---|---|
| OPEN/CLOSE | DATE AND TIME OF OCCURRENCE |
| OPEN | A/B (MO/DY) C:D (AM/PM) |
| CLOSE | D/E (MO/DY) F:G (AM/PM) |
| ⋮ | ⋮ |

FIG.4B

220

| CONDITION RECORDING AREA (CIPHER A) | |
|---|---|
| CONDITION | DATE AND TIME OF OCCURRENCE |
| IMPACT | X/X (MO/DY) X:X (AM/PM) |
| EXTRAORDINARILY HIGH TEMPERATURE | Y/Y (MO/DY) Y:Y (AM/PM) |
| HIGH HUMIDITY | W/W (MO/DY) W:W (AM/PM) |
| ⋮ | ⋮ |

METHOD AND SYSTEM FOR AUTOMATIC TELLER MACHINE CASH MANAGEMENT

FIELD OF THE INVENTION

The present invention relates to a management apparatus, a cash cassette, an automatic teller machine, an information processing system, a management method, and a control method. More specifically, the present invention relates to a management apparatus for detecting the occurrence of errors relating to, a cash cassette, an automatic teller machine, an information processing system, a management method, and a control method.

BACKGROUND ART

It is conventional that automatic teller machines are installed in a financial institution such as a bank, and when an error occurs in a cash cassette for storing cash, information (error code or the like) on the type of error that occurred is recorded in a memory device provided in the automatic teller machine, and an error message is displayed to a clerk. For example, there are proposed a technique for recording, in a memory of an automatic teller machine or the like, data indicating an incorrect open or closed position of a partition plate relative to the opening part of a currency storage case (see Patent Document 1), and a technique for recording a failure of a sensor for discriminating bills (see Patent Document 2). In the event of such an error or failure, a maintenance worker for the bank repairs and inspects the cash cassette based on the recorded data such as an error code displayed on the screen.

On the other hand, automatic teller machines have recently been introduced into retail stores such as convenience stores to increase user convenience. An automatic teller machine installed in a retail store is under the control of a financial institution such as a bank, not of the manager of the store. It means that the manager of the store is not permitted to add bills into a cash cassette inside the store immediately when the automatic teller machine runs low on paper currency. Therefore, the cash cassette for storing bills needs to be removable from the automatic teller machine so that a maintenance worker from the bank can replace the cash cassette with a refilled cash cassette.

When an error occurs in such a cash cassette in the automatic teller machine, the maintenance worker from the bank replaces the cash cassette with a normal cash cassette, and brings the defective cash cassette back to a cash center for repair and inspection based on information that was displayed on the automatic teller machine. In such a case, the maintenance worker attaches onto the cash cassette a memo including the serial number of the automatic teller machine used when the error occurred, the type of error, etc. not only to distinguish the defective cash cassette from other cassettes that are not defective but are low on cash, but also to do proper repair work.

The manufacturing cost of a cash cassette is high because it is made sturdy for security reasons such as crime prevention. It is therefore preferable to reuse any cash cassette collected by maintenance workers and replenished it with bills. It means that the cash cassette is not always loaded in the same automatic teller machine. In some cases, it is loaded in two or more automatic teller machines. Thus, in the conventional system, information on an error occurring in a cash cassette is scattered across and recorded in two or more automatic teller machines.

There are also proposed other techniques for providing a memory device in each cash cassette and recording various kinds of information therein (see Patent Document 3 and Patent Document 4).

[Patent Document 1] JP-A-5-159129

[Patent Document 2] JP-A-11-102456

[Patent Document 3] JP-A-2003-6714

[Patent Document 4] JP-A-7-302367

However, if the contents of the memo on the cash cassette attached by the maintenance worker are misinterpreted by a person in charge of repair work, the cash cassette could be reused without proper repair work. In this case, it could cause the same error again. Further, even if the person in charge tries to repair and inspect the cash cassette properly by collecting error information from the automatic teller machine, since the error information on each cash cassette is scattered across two or more automatic teller machines, the person in charge may not be able to collect all the history of the error occurred in the cash cassette.

In addition, an automatic teller machine being installed in a store may not have some functions for the purpose of reducing the installation space. For example, the automatic teller machine may not have a function to verify if the number of bills actually stored in the cash cassette agrees with the number of bills transacted through the automatic teller machine. In such a case, though it is necessary to count the number of bills in the cash cassette after collecting it from the store, it is troublesome to do so.

SUMMARY OF THE INVENTION

It is therefore an object of the present invention to provide a management apparatus, a cash cassette, an automatic teller machine, an information processing system, a management method, and a control method, which can solve the aforementioned problems. This object can be achieved by combinations of features described in the appended independent claims. On the other hand, the dependent claims provide further advantageous embodiments of the present invention.

To solve the above problems, in the first aspect of the present invention, there is provided a management apparatus which is detachable from a cash cassette for managing the cash cassette storing bills or coins for cash transactions with users at an automatic teller machine, the cash cassette comprising: an error information recording area for recording identification information identifying a type of error in the event of occurrence of the error; and a count information recording area for recording count information indicating the number of bills or coins expected to be in the cash cassette, and a management apparatus comprising: an error determination unit for determining, based on the identification information acquired from the error information recording area, whether the error occurred is of the kind that could cause a difference between the count information in the count information recording area and the number of bills or coins in the cash cassette; and a count information output unit, which outputs an instruction that management staff should count the number of bills or coins in the cash cassette when the error determination unit determines that such a type of error has occurred, or acquires and outputs the count information from the count information recording area when the error determination unit determines that such a type of error has not occurred. It should be noted that the first aspect of the present invention does not cite all the features of the present invention, and sub-combinations of such features can also constitute the present invention.

According to the present invention, not only is proper repair and inspection work on a cash cassette carried out, but also counting of bills or coins in the cash cassette is facilitated.

BRIEF DESCRIPTION OF THE SEVERAL VIEWS OF THE DRAWINGS

FIG. 3*a* shows a non-limiting example of a data structure of an error information recording area, according to one embodiment of the present invention;

FIG. 3*b* shows a non-limiting example of a data structure of a count information recording area, according to one embodiment of the present invention;

FIG. 4*a* shows a non-limiting example of a data structure of an open/close information recording area, according to one embodiment of the present invention;

FIG. 4*b* shows a non-limiting example of a data structure of a condition recording area, according to one embodiment of the present invention;

DETAILED DESCRIPTION OF THE PREFERRED EMBODIMENT

The present invention will now be described by way of a preferred embodiment. It is to be understood that the embodiment being described below is not to limit the scope of the invention being defined in the appended claims, and that all combinations of features being described in the embodiment may not be essential to the present invention.

Figure 1:
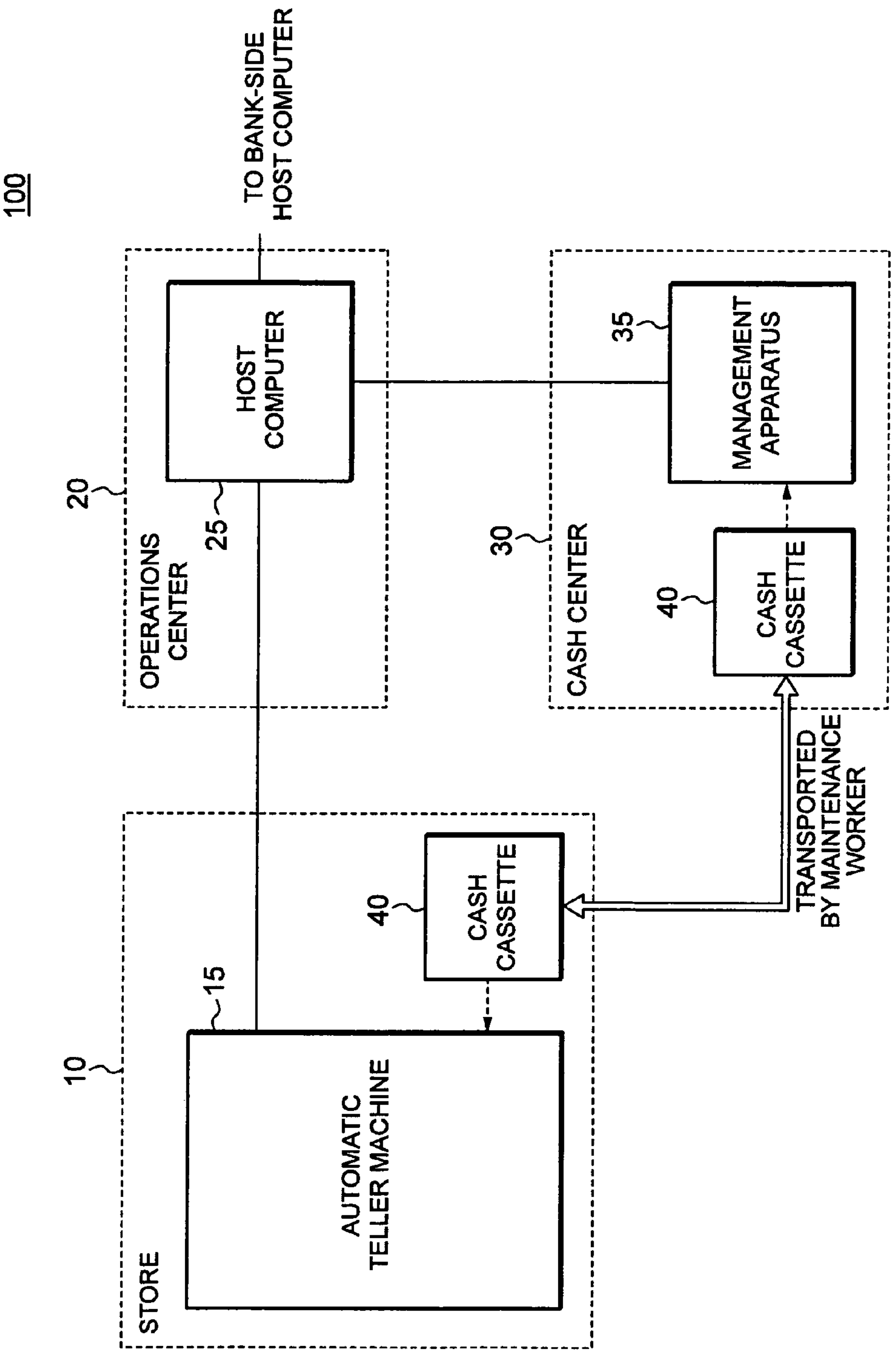
FIG. 1 shows a non-limiting block diagram of an information processing system according to one embodiment of the present invention.

FIG. 1 is a block diagram of an information processing system 100. The information processing system 100 includes an automatic teller machine 15, a host computer 25, a management apparatus 35, and a cash cassette 40. The automatic teller machine 15 is installed in a store 10 such as a retail store. The host computer 25 is installed in an operations center 20 where operation staff manages all transactions made through the automatic teller machine 15. The management apparatus 35 is installed in a cash center 30 where management staff manages the validity of the number of bills or coins in the cash cassette 40.

The automatic teller machine 15 automatically performs cash transactions with users using bills or coins in the cash cassette 40. In the case a of shortage of bills in the cash cassette 40 or in the event of an error in the cash cassette 40, a maintenance worker removes the cash cassette 40 from the automatic teller machine 15, and replaces it with another cash cassette. The removed cash cassette 40 is transported to the cash center 30 and attached to the management apparatus 35. The management apparatus 35 counts the number of bills in the cash cassette 40, and sends the count information to the host computer 25. The host computer 25 sends personal information on the user concerned, such as his or her deposit balance, to the automatic teller machine 15. Upon receiving a transaction result from the automatic teller machine 15, the host computer 25 communicates with a host computer on the bank side to update the user information such as the deposit balance. The host computer 25 also verifies if the transaction result from the automatic teller machine 15 agrees with the count information on the number of bills received from the management apparatus 35. Thus the system aims not only to do proper repair work on the cash cassette 40 that caused an error, but also to deal speedily with counting the number of bills in the cash cassette 40 collected and returned to the cash center 30.

Figure 2:
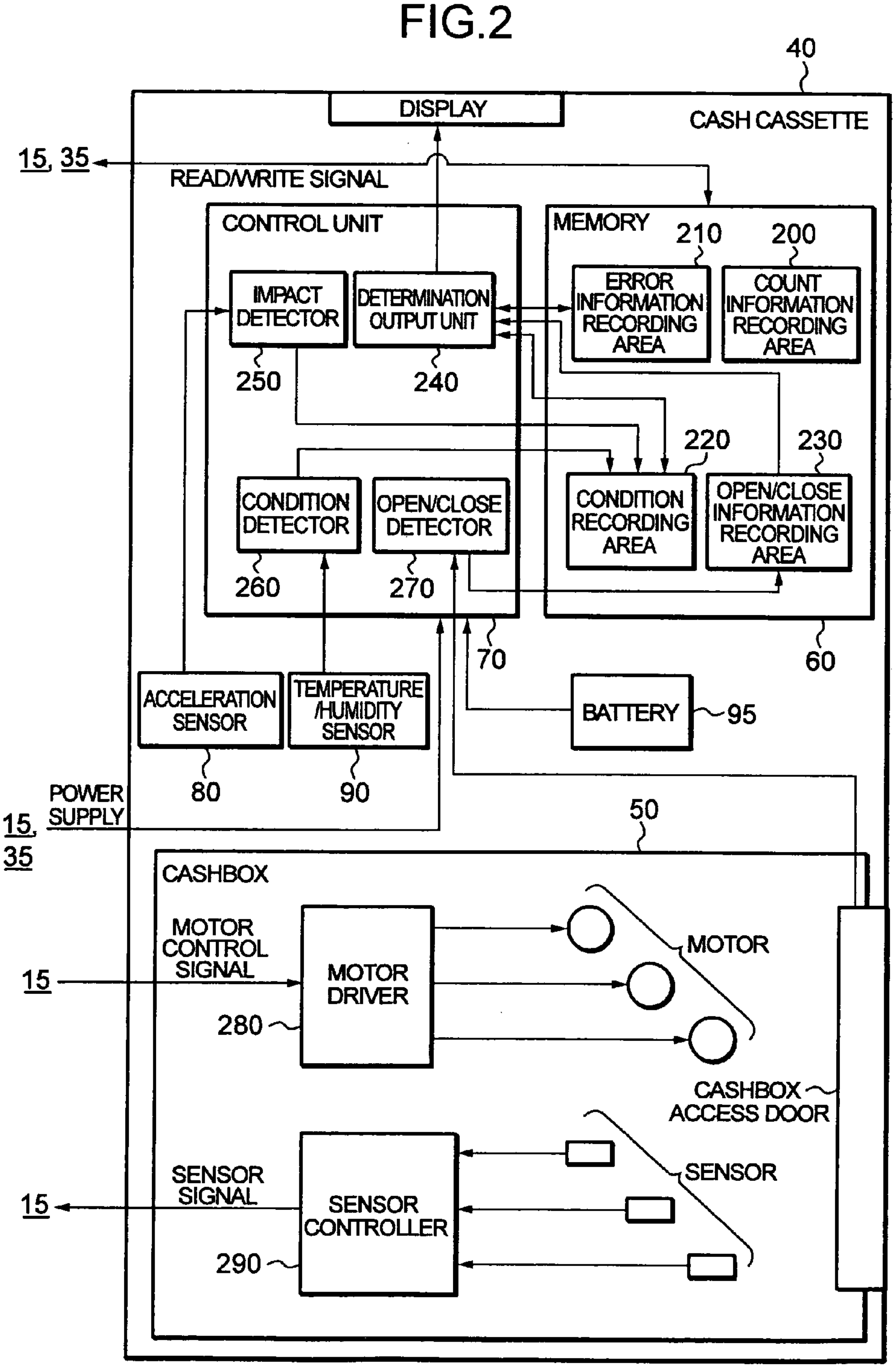
FIG. 2 shows anon-limiting functional block diagram of a cash cassette according to one embodiment of the present invention.

FIG. 2 is a functional block diagram of the cash cassette 40. The cash cassette 40 has a cashbox 50, a non-volatile memory 60, a control unit 70, an acceleration sensor 80, a temperature/humidity sensor 90, and a battery 95. The cashbox 50 holds predetermined denominations of bills or coins. The cashbox 50 supplies the bills or coins to the automatic teller machine 15 while it stores bills and coins from the automatic teller machine 15. The cashbox 50 has an access door through which bills or coins are replenished and stored in the case of shortage.

The memory 60 has a count information recording area 200, an error information recording area 210, a condition recording area 220, and an open/close information recording area 230. Upon receiving an instruction from the automatic teller machine 15 or the management apparatus 35, count information indicating the number of bills or coins expected to be in the cash cassette 40 is recorded in the count-information recording area 200. In the event of an error in the cash cassette 40, the error information recording area 210 receives an instruction from the automatic teller machine 15, the management apparatus 35 or a determination output unit 240 to record identification information identifying the type of error occurred. The memory 60 and the automatic teller machine 15 or the management apparatus 35 are connected to each other by wire, such as through an I2C interface, a serial port, or a parallel port, or by wireless using a radio communication system, such as an RFID (Radio Frequency-Identification) or infrared communication system.

The condition recording area 220 receives an instruction from an impact detector 250 or a condition detector 260 to record the condition of the cash cassette 40. For example, when the cash cassette 40 is given an impact by someone forcing it down or something bumping against it, the condition recording area 220 receives an instruction from the impact detector 250 to record information indicating the detection of an impact. The open/close information recording area 230 receives an instruction from an open/close detector 270 to record information indicating that the access door to the cashbox 50 has been unlocked or locked.

When the cash cassette 40 is loaded in the automatic teller machine 15 or attached to the management apparatus 35, the control unit 70 is driven by a power supply of the machine or apparatus. On the other hand, when the cash cassette 40 is removed from the machine or apparatus, the control unit 70 is driven by the battery 95 to write information into the memory 60 and read the information from the memory 60 to perform determination processing. The control unit 70 makes a determination on the information read out of the memory 60 and outputs the determination result to a display. Specifically, the control unit 70 has a determination output unit 240, the impact detector 250, the condition detector 260, and the open/close detector 270.

For example, upon receiving a notice from the automatic teller machine 15 in the event of an error, the determination output unit 240 determines, based on the identification information identifying the type of error recorded in the error information recording area 210, whether errors of the same kind have occurred at an incidence higher than a standard incidence predetermined for the kind. When determining that the same type of errors have occurred at an incidence higher than the standard incidence, the determination output unit 240 displays an instruction on the display screen that the cash cassette 40 should be inspected or repaired. In this case, the determination output unit 240 may also record, in the error information recording area 210, information indicating that the cash cassette 40 needs inspecting or repairing. Further, the determination output unit 240 may display information indicating that the impact detector 250 has detected an impact, in association with the instruction that the cash cassette 40 should be inspected or repaired. Furthermore, the determination output unit 240 may acquire, from the open/close information recording area 230, information indicating that the cashbox 50 has been unlocked or locked, and display the information on the display screen.

The term "display" indicates an example of output processing, such as to display text or images on an LCD panel. The display processing may be of any other form, such as to change the color(s) or pattern of a chemical material on the display by causing a chemical change. In this case, appropriate information can be externally outputted even if the battery 95 goes weak. Alternatively, the determination output unit 240 may sound an alert or output the information in the form of an electrical signal. For example, the determination output unit 240 may output the notice that the cash cassette 40 should be inspected or repaired to the automatic teller machine 15 and to the operations center 20 through a communication network.

To be more specific, the determination output unit 240 determines whether the same type of errors have occurred in the cash cassette 40 at an incidence higher than not only the standard incidence but also a repair requiring incidence predetermined for the kind. When determining that the same type of errors have occurred at an incidence higher than the repair requiring incidence, the determination output unit 240 displays an instruction on the display screen that the cash cassette 40 should be repaired immediately. On the other hand, when determining that the incidence of the same type of errors is higher than the standard incidence but lower than the repair requiring incidence, the determination output unit 240 displays an instruction on the display screen that the part that caused the type of error should be checked at the time of a routine inspection of the cash cassette 40. The values of the standard incidence and the repair requiring incidence may vary depending on the type of error.

When detecting an impact to the cash cassette 40 based on the magnitude of gravity measured by the acceleration sensor 80, the impact detector 250 records in the condition recording area 220 information indicating that the impact has been given. In this case, the impact detector 250 may also record the time of occurrence of the impact. Then, when detecting a temperature higher or lower than a standard range of temperature or humidity higher or lower than a standard range of humidity based on the information on the temperature or humidity in or around the cash cassette 40, the condition detector 260 records it in the condition recording area 220. In this case, the condition detector 260 may also record the time of detection. Further, when detecting, based on a signal from the cashbox access door, that the access door to the cashbox 50 has been unlocked or locked, the open/close detector 270 records it in the open/close information recording area 230. In this case, the open/close detector 270 may also record the time of detection.

When receiving a motor control signal from the automatic teller machine 15, a motor driver 280 drives motors inside the cashbox 50 to allow bills or coins to enter or be dispensed. A sensor controller 290 receives information from various sensors for manipulating the flow of bills or coins, and outputs the information to the automatic teller machine 15.

FIG. 3(*a*) shows an example of the data structure of the error information recording area 210. The error information recording area 210 of the memory 60 holds records of information encrypted with cryptography or cipher A that allows management staff of the cash center to decrypt the information, each record consisting of the following fields: error code, date and time of occurrence, machine's serial number, part identification information, repair requiring flag, and preventive maintenance flag. The following describes these kinds of information. The cipher A is an encryption processing system using an encryption key whose identifier is A. Alternatively, the cipher A may be an encryption processing system using an algorithm whose identifier is A.

In the event of an error in the cash cassette 40, the error information recording area 210 receives an instruction from the automatic teller machine 15 to record identification information identifying the type of error, for example an error code, in association with the date and time of occurrence of the error. The error information recording area 210 is also instructed to record the serial number of the machine, as identification information on the automatic teller machine 15 in which the error occurred, in association with the error code and the date and time of occurrence of the error. In this example shown, the error information recording area 210 holds the error code E1234 in association with Y(Year) Z(month) X(day) at A:B (AM/PM) as the date and time of occurrence of the error, and SN1001 as the serial number of the machine.

The error information recording area 210 also receives an instruction from the determination output unit 240 to record information indicating whether the cash cassette 40 needs inspecting or repairing. Specifically, the error information recording area 210 sets a repair requiring flag indicating whether to repair the defective part immediately, and a preventive maintenance flag indicating whether to check the defective part at the time of a routine inspection or not, in association with the part identification information for identifying each part of the cash cassette 40. In the example shown, the error information recording area 210 holds a flag indicating that any repair of the part is unnecessary, and a flag indicating that any inspection of the part is unnecessary, in association with PN5655 as the part identification information.

The following describes an example of processing in which the determination output unit 240 sets the repair requiring flag and the preventive maintenance flag. The determination output unit 240 refers to the error code and the date and time of occurrence to count the number of times the error indicated by the same error code has occurred within a predetermined period of time. If the number of times counted exceeds a predetermined reference number of times, the determination output unit 240 determines that the errors with the error code have occurred at an incidence higher than the standard incidence. In this case, the determination output unit 240 determines that the part that has caused the errors corresponding to the error code needs repairing or inspecting, and changes the repair requiring flag or the preventive maintenance flag corresponding to the record of the part to "Required". The values of the reference number of times and the standard incidence may vary depending on the type of error.

The term "inspection" used here means routine preventive-maintenance and inspection to prevent the occurrence of the error in the cash cassette 40. In the conventional way, it may be unclear on which part of the cash cassette 40 the preventive-maintenance and inspection work should focus. In contrast, the determination output unit 240 can set the preventive maintenance flag to indicate the part on which more weight should be placed during the preventive-maintenance and inspection work. In addition, the error code in the error information recording area 210 can be analyzed in detail to perform further detailed diagnosis, thereby enabling more accurate error diagnosis.

The error in the cash cassette 40 indicates, for example, a condition that disables the cash cassette 15 from receiving or dispensing currency, a condition that disables the writing and reading of information to and from the memory 60 provided in the cash cassette 40, or a condition that causes improper transportation of currency in the cash cassette 40. The error conditions also include such a condition as to retry the same operation after the cash cassette 40 failed to receive or dispense currency. Further, the error conditions include conditions resulting from the manipulation of the cash cassette 40 by the automatic teller machine 15, such as a condition in which currency drawn from the cash cassette 40 and to be dispensed to a user is jammed in the automatic teller machine 15.

FIG. 3(*b*) shows an example of the data structure of the count information recording area 200. The count information recording area 200 has a cash-counter field and a statistic-counter field. The count information recording area 200 holds, in the cash counter field, information on the total number of bills or coins entered and the total number of bills or coins dispensed from when the cash cassette 40 is loaded in the automatic teller machine 15 until it is removed therefrom, and information on the number of bills or coins in the cassette 40 as count information indicating the number of bills or coins expected to be in the cash cassette 40.

The number of bills or coins expected to be in the cash cassette 40 is calculated based on the number of bills or coins in the cash cassette 40 at the time of being loaded in the automatic teller machine 15 by adding the number of bills or coins entered in the automatic teller machine 15 to and subtracting the number of bills or coins dispensed from the automatic teller machine 15. Therefore, if one or more bills or coins that are unlikely to remain in the automatic teller machine 15 during normal operation are jammed due to some error, the number of bills or coins expected to be in the cash cassette 40 will correspond to the total number of bills or coins not only in the cash cassette 40 but in the automatic teller machine 15.

The cash cassette 40 also has a reject bin to store bills or coins that caused an error in the cash receiving or dispensing operation of the automatic teller machine 15, such as bills that are torn or damaged, folded bills or curved bills, or two or more bills that are stuck together. Therefore, the count information recording area 200 may also hold, in the cash-counter field, the number of rejected bills or coins in the reject bin. The count information recording area 200 holds information on the number of bills entered and the number of bills dispensed in the form of data encrypted with a cipher B different from the cipher A. The cipher B allows operation staff of the operations center 20, where all transactions made through the automatic teller machine 15 are managed, to decrypt the encrypted information, but disables the management staff of the cash center 30 from decrypting it. On the other hand, the count information recording area 200 holds the information on the count of cash in the cassette and the information on the count of cash in the reject bin in the form of data encrypted with the cipher A. In the event of a reject, the count of cash in the cash cassette 40 and the count of cash in the reject bin are unknown, but the total sum is unchanged.

Further, the count information recording area 200 holds in the statistic-counter field the total count of cash transacted, which is the cumulative number of bills or coins that have been stored and drawn into and from the cash cassette 40 up to this time since the cash cassette 40 was put into service. The count information recording area 200 also holds in the statistic-counter field the total count of cash dispensed, which is the cumulative number of bills or coins that have been removed from the cash cassette 40, and the total count of cash entered, which is the cumulative number of bills or coins that have been stored in the cash cassette 40, up to this time since the cash cassette 40 was put into service. Alternatively, or in addition, the count information recording area 200 may hold the total number of caseloads of the cash cassette 40 through any automatic teller machine, such as the total number of transactions, the total count of cash entered, and the total count of cash dispensed.

The count information recording area 200 further holds in the statistic-counter field the count of errors corresponding to the number of errors caused by dispensing and receiving cash from and into the cash cassette 40, and the count of retries corresponding to the number of retries made after an error in dispensing or receiving cash from or into the cash cassette 40. The count information recording area 200 holds the total count of cash transacted, the total count of cash dispensed, the total number of bills or coins entered, the count of errors, and the count of retries in the form of data encrypted with the cipher A.

Alternatively, at least some pieces of information encrypted with the cipher A in the example shown may be encrypted with a cipher C different from the ciphers A and B. For example, the information recorded in the error information recording area 210 and the count of cash in the cassette may be encrypted with the cipher C. The cipher C may allow a maintenance service provider to decrypt the information as well as the management staff and the operation staff of both centers that commissioned the maintenance service provider to do maintenance work on the cash cassette 40 or the automatic teller machine 15. In this case, it is preferable that the maintenance service provider be disabled from decrypting the ciphers A and B. Thus, detailed access levels can be granted according to the person to access the information in the storage device 60.

FIG. 4(*a*) shows an example of the data structure of the open/close information recording area 230. The open/close information recording area 230 holds information, which indicates whether the cashbox access door through which bills or coins are stored in the cash cassette 40 has been unlocked or locked, in the form of data encrypted with the cipher A in association with the date and time of opening or closing the cashbox access door. In other words, the open/close detector 270 detects, based on the signal from the access door to the cashbox 50, information indicating that the access door to the cashbox 50 has been unlocked or locked, and records the information in the open/close information recording area 230 in association with the date and time of detection. The recorded information may be outputted as warning information when the cash cassette 40 is loaded in the automatic teller machine 15.

FIG. 4(*b*) shows an example of the data structure of the condition recording area 220. The condition recording area 220 holds information, which indicates that the cash cassette 40 is at a temperature higher or lower than the standard range of temperature or at a humidity higher or lower than the standard range of humidity, in the form of data encrypted with the cipher A in association with the date and time of recording. In other words, when detecting a temperature or humidity higher or lower than the standard range, the condition detector 60 records it in the condition recording area 220 in association with the time of recording. Further, when an impact is applied to the cash cassette 40, the condition recording area 220 is instructed to record information indicating the application of the impact in the form of data encrypted with the cipher A in association with the date and time of the application of the impact. In other words, when detecting an impact to the cash cassette 40, the impact detector 250 records it in the condition recording area 220 in association with the time of detection.

Preferably, the memory 60 further holds basic information such as identification information unique to the cash cassette 40, a revision number (for example, information on the past design-change stage) of the cash cassette 40, or information on the dates and times of the past repairs or protective-maintenance and inspection operations. In this case, the information recorded in the memory 60 may be displayed on the display screen of the cash cassette 40 or the display of the automatic teller machine 15, or the display on the management apparatus 35. It makes it easy for the repair man to find which cash cassette 40 should be repaired during repair work. Further, even when a large number of cash cassettes 40 have been in operation, all the cash cassettes 40 can be checked without omission during a routine inspection such as for preventive-maintenance and inspection.

Figure 5:
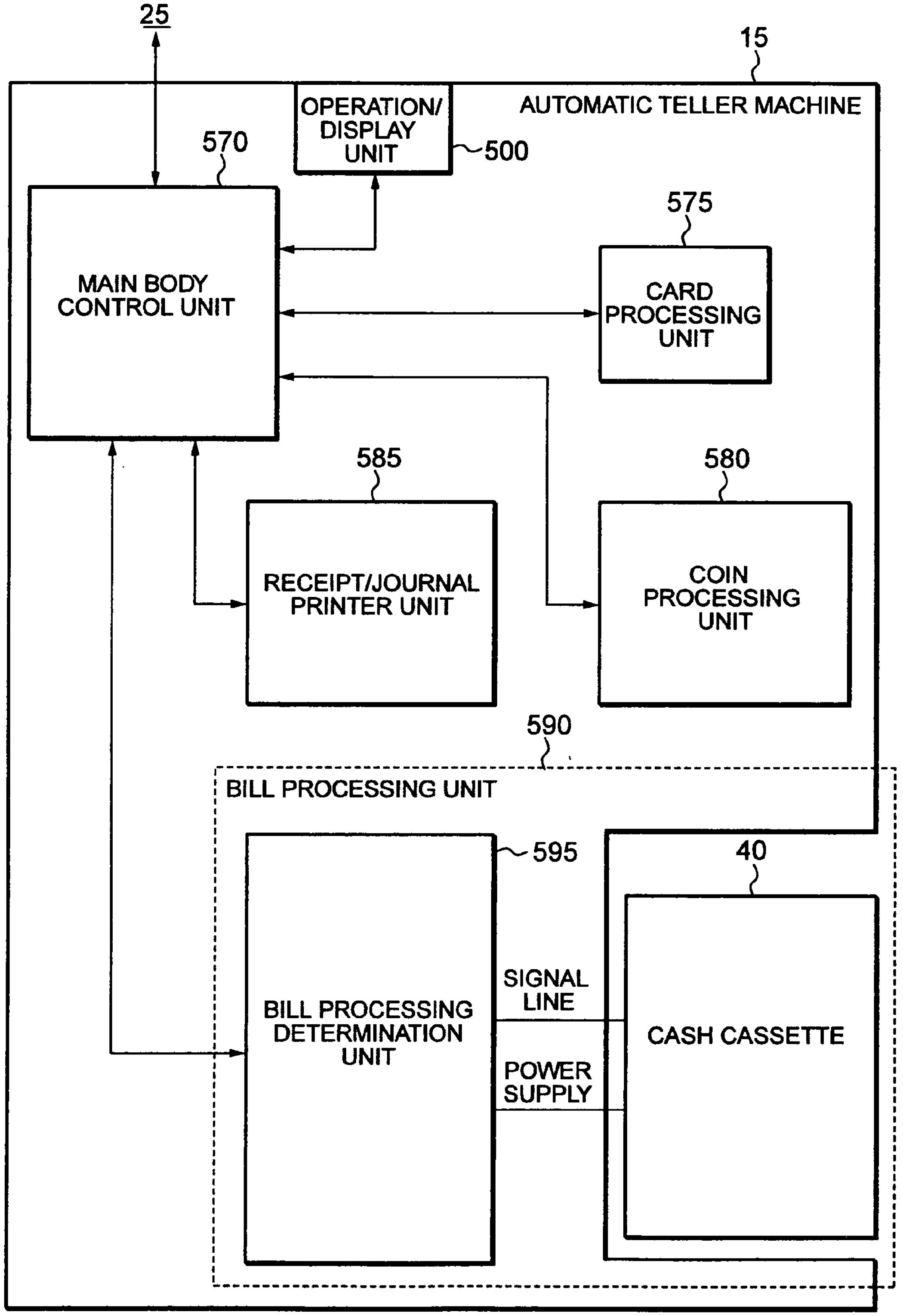
FIG. 5 shows a non-limiting example of a functional block diagram of an automatic teller machine, according to one embodiment of the present invention.

FIG. 5 is a functional block diagram of the automatic teller machine 15. The automatic teller machine 15 has an operation/display unit 500, a main body control unit 570, a card processing unit 575, a coin processing unit 580, a receipt/journal printer unit 585, and a bill processing unit 590. The main body control unit 570 performs cash dispensing and the like based on information recorded on a cash card or the like inserted into the card processing unit 575 and user's operations through the operation/display unit 500.

For example, the main body control unit 570 may perform cash acceptance and dispensing by sending instructions to the coin processing unit 570 and the bill processing unit 590. The main body control unit 570 may also communicate with the host computer 25 to perform other processing. Further, the main body control unit 570 may instruct the receipt/journal printer unit 585 to print out the results of cash acceptance and dispensing or other processing. In this case, the cash cassette 40 is loaded in the bill processing unit 590. The bill processing unit 590 has a bill-processing determination unit 595 that controls and powers the cash cassette 40.

Figure 6:
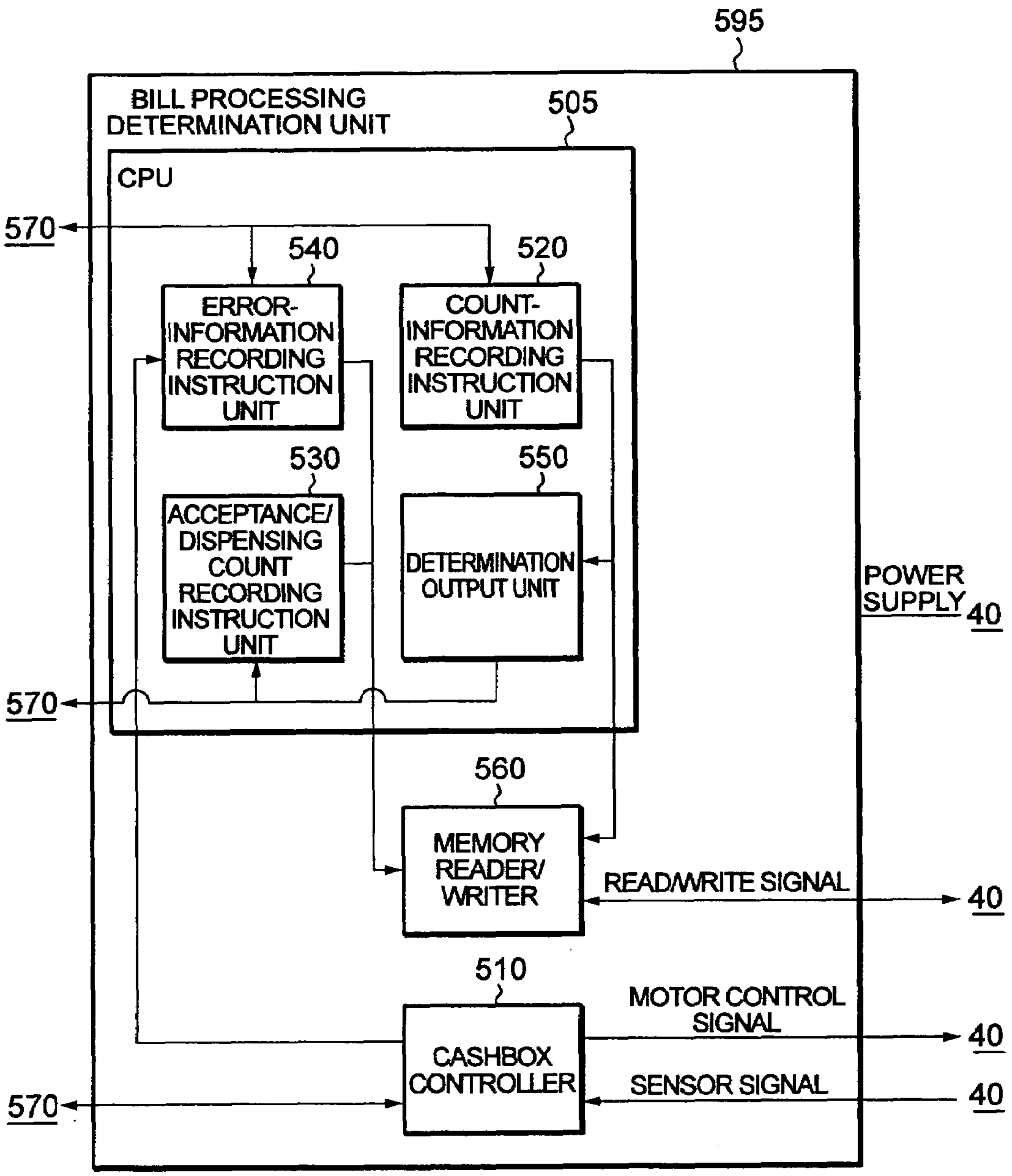
FIG. 6 shows a non-limiting example of a functional block diagram of a bill-processing determination unit, according to one embodiment of the present invention.

FIG. 6 is a functional block diagram of the bill-processing determination unit 595. The bill-processing determination unit 595 has a CPU 505, a cashbox controller 510, and a memory reader/writer 560. A program for controlling the bill processing determination unit 595 allows the CPU 505 to function as a count information recording instruction unit 520, an acceptance/dispensing count recording instruction unit 530, an error-information recording instruction unit 540, and a determination output unit 550. The bill-processing determination unit 595 may also have a function to power the cash cassette 40.

Upon receiving an instruction from the main body control unit 570, the cashbox controller 510 sends a motor control signal to the motor driver 280 of the cash cassette 40 to allow the cash cassette 40 to accept or dispense currency. In this case, the cashbox controller 510 may use information represented by a sensor signal from the sensor controller 290 of the cash cassette 40. When detecting an error in the cash cassette 40 based on the sensor signal from the sensor controller 290, the cashbox controller 510 sends the error-information recording instruction unit 540 identification information identifying the type of error together with information on the date and time of occurrence of the error.

Upon receiving information indicating the contents of a cash acceptance/dispensing operation from the main body control unit 570, the count-information recording instruction unit 520 instructs the memory reader/writer 560 to update the count of cash in the cassette, or the count of cash in the reject bin recorded in the count information recording area 200 of the cash cassette 40. In this case, it is preferable that the count-information recording instruction unit 520 should encrypt the information on the count of cash in the cassette or the count of cash in the reject bin using the cipher A before recording it in the count information recording area 200 of the memory 60 in the cash cassette 40.

Upon receiving the information indicating the contents of the cash acceptance/dispensing operation from the main body control unit 570, the acceptance/dispensing count recording instruction unit 530 also instructs the memory reader/writer 560 to update the information on the count of cash entered, the count of cash dispensed, the total count of cash transacted, the total count of cash dispensed, or the total count of cash entered, recorded in the count information recording area 200 of the cash cassette 40. In this case, it is preferable that the acceptance/dispensing count recording instruction unit 530 should records the count of cash entered or the count of cash dispensed in the form of data encrypted with the cipher B different from the cipher A. On the other hand, the acceptance/dispensing count recording instruction unit 530 records the total count of cash transacted, the total count of cash dispensed, and the total count of cash entered, in the form of data encrypted with the cipher A. This makes it possible not only to notify the management staff of the cash center 30 of the information required to verify the number of bills or coins in the cash cassette 40, but also to preserve the privacy of details of transactions with users through the automatic teller machine 15.

When the cashbox controller 510 detects an error in the cash cassette 40, the error-information recording instruction unit 540 receives from the cashbox controller 510 identification information identifying the type of error and information on the date and time of occurrence of the error. Then the error-information recording instruction unit 540 instructs the memory reader/writer 560 to record the information in the error information recording area 210 of the cash cassette 40. On the other hand, the determination output unit 550 instructs the memory reader/writer 560 to acquire the identification information and the information on the date and time of occurrence from the error information recording area 210. Then, when determining, based on the information acquired, that the same type of errors have occurred in the same cash cassette 40 at an incidence higher than the standard incidence predetermined for the kind, the determination output unit 550 records in the error information recording area 210 information indicating that the cash cassette 40 needs inspecting or repairing, that is, it sets the require requiring flag or preventive maintenance flag.

On the other hand, when determining that the cash cassette 40 needs an immediate repair, the determination output unit 550 displays it on the operation/display unit 500 through the main body control unit 570 to hasten its repair. In the example shown, the determination output unit 550 determines whether to inspect or repair based on the identification information acquired from the error information recording area 210, but this determination process is not of absolute necessity. Instead, the determination output unit 550 may acquire the information indicating whether to inspect or repair the cash cassette 40 from the determination output unit 240 and just display the information on the operation/display unit 500. In other words, either the determination output unit 240 or the determination output unit 550 may determine whether to repair or inspect the cash cassette 40 based on the identification information identifying the type of error in the cash cassette 40. Alternatively, when the cash cassette 40 is loaded, the main body control unit 570 may read the information indicating that the cash cassette 40 needs repairing or inspecting and put the cash cassette 40 out of service.

Figure 7:
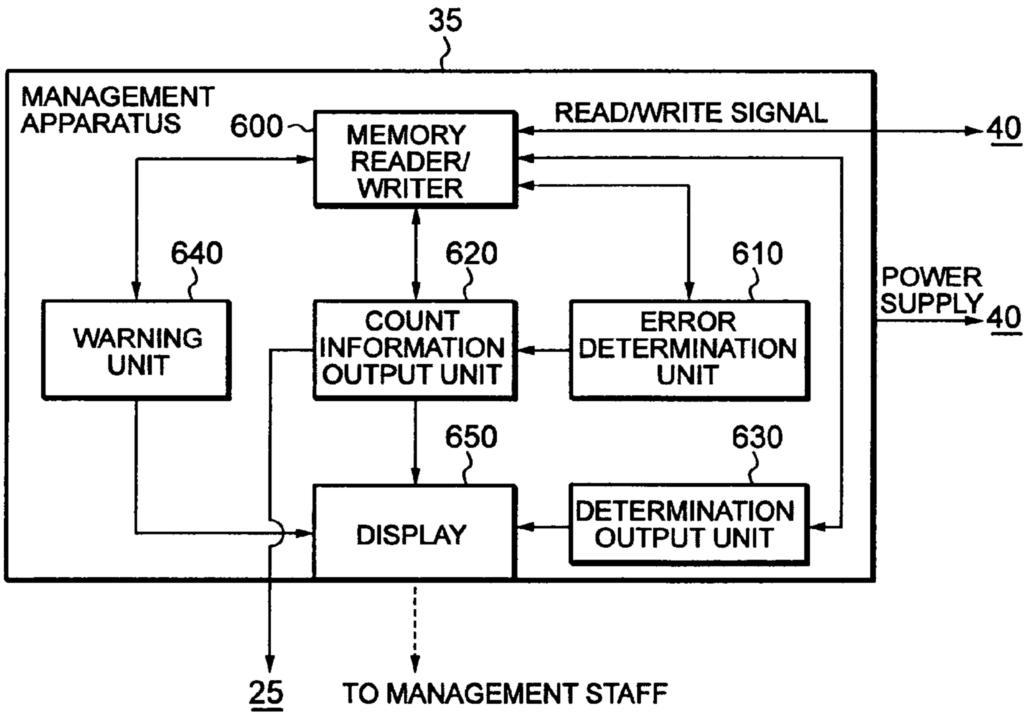
FIG. 7 shows a non-limiting example of a functional block diagram of the management apparatus, according to one embodiment of the present invention.

FIG. 7 is a functional block diagram of the management apparatus 35. The management apparatus 35 has a memory reader/writer 600, an error determination unit 610, a count information output unit 620, a determination output unit 630, a warning unit 640, and a display 650. The error determination unit 610 instructs the memory reader/writer 600 to acquire the identification information on the error occurred in the cash cassette 40 from the error information recording area 210. Then the error determination unit 610 determines, based on the identification information acquired, whether the error is of the kind that could cause a difference between the count information in the count information recording area 200 and the number of bills or coins currently remaining in the cash cassette 40.

One example is that the error determination unit 610 determines whether a coin(s) or a bill(s) drawn from the cash cassette 40 or inserted by a user was jammed in the automatic teller machine 15. As other examples, the error determination unit 610 may determine whether the contents of the count information recording area 200 have been erased to make it impossible to read the information, or whether a sensor failure has occurred due to dust.

When determining that the error is of the kind that could cause a difference between the count information in the count information recording area 200 and the number of bills or coins currently remaining in the cash cassette 40, the count information output unit 620 displays an instruction on the display 650 to the cash management staff to count the number of bills or coins in the cash cassette 40. For example, if a bill(s) or a coin(s) was ever jammed in the automatic teller machine 15, the count information output unit 620 will display an instruction to count the number of bills or coins by adding the number of bills or coins that were jammed in and removed from the automatic teller machine 15. In this case, the count information output unit 620 may erase the count information in the count information recording area 200 after displaying this instruction.

On the other hand, when determining that such a type of error has not occurred, the count information output unit 620 instructs the memory reader/writer 600 to acquire the count information from the count information recording area 200 and displays the count information on the display 650. Alternatively, or in addition, the count information output unit 620 may output the acquired count information to the host computer 25. Further, after this output processing, the count information output unit 620 may erase the count information in the count information recording area 200.

The determination output unit 630 instructs the memory reader/writer 600 to acquire from the error information recording area 210 the identification information identifying the type of error occurred in the cash cassette 40 and the information on the date and time of occurrence. Then, based on the acquired information, when determining that the same type of errors have occurred in the cash cassette 40 at an incidence higher than the standard incidence predetermined for the kind, the determination output unit 630 displays information on the display 650 to instruct that the cash cassette 40 should be inspected or repaired. The value of the standard incidence may vary depending on the type of error.

When acquiring from the condition recording area 220 the information indicating that an impact has been applied to the cash cassette 40, it is preferable that the determination output unit 630 further display the information in association with the information indicating that the cash cassette 40 needs inspecting or repairing. Further, when acquiring from the condition recording area 220 the information indicating that the temperature or humidity of the cash cassette 40 have become extraordinarily high or low, the determination output unit 630 may further display the information.

In the example shown, the determination output unit 630 determines, based on the identification information acquired from the error information recording area 210, whether the cash cassette 40 needs inspecting or repairing, but this determination process is not of absolute necessity. Instead, the determination output unit 630 may acquire the information indicating whether to inspect or repair the cash cassette 40 from the determination output unit 240 and just display the information on the display 650. In other words, either the determination output unit 240 or the determination output unit 630 may determine whether to repair or inspect the cash cassette 40 based on the identification information identifying the type of error in the cash cassette 40.

The warning unit 640 instructs the memory reader/writer 600 to acquire from the open/close information recording area 230 the information on the date and time of opening the access door to the cashbox 50. Then, based on the information acquired from the open/close information recording area 230, when determining that the access door to the cashbox 50 was unlocked during the period from the last attachment to the current attachment of the cash cassette 40 to the management apparatus 35, the warning unit 640 displays a warning on the display 650 to indicate that the lock of the cashbox access door was tampered with.

One way of making this determination is that the warning unit 640 erases all information recorded in the open/close information recording area 230 each time the cash cassette 40 is removed from the management apparatus 35. Then, when the cash cassette 40 is attached to the management apparatus 35 again, if any information is recorded in the open/close information recording area 230, the warning unit 640 determines that the access door to the cashbox 50 was unlocked during the period from the last attachment to the current attachment of the cash cassette 40 to the management apparatus 35. In order to put the information to work on the investigation of the cause of the tampering, it is preferable that the warning unit 640 further display the information on the date and time of unlocking the cashbox access door. Each unit shown in FIG. 7 may be implemented as a software module executed by a CPU, or as a hardware module. Further, the management apparatus 35 may power the cash cassette 40.

Figure 8:
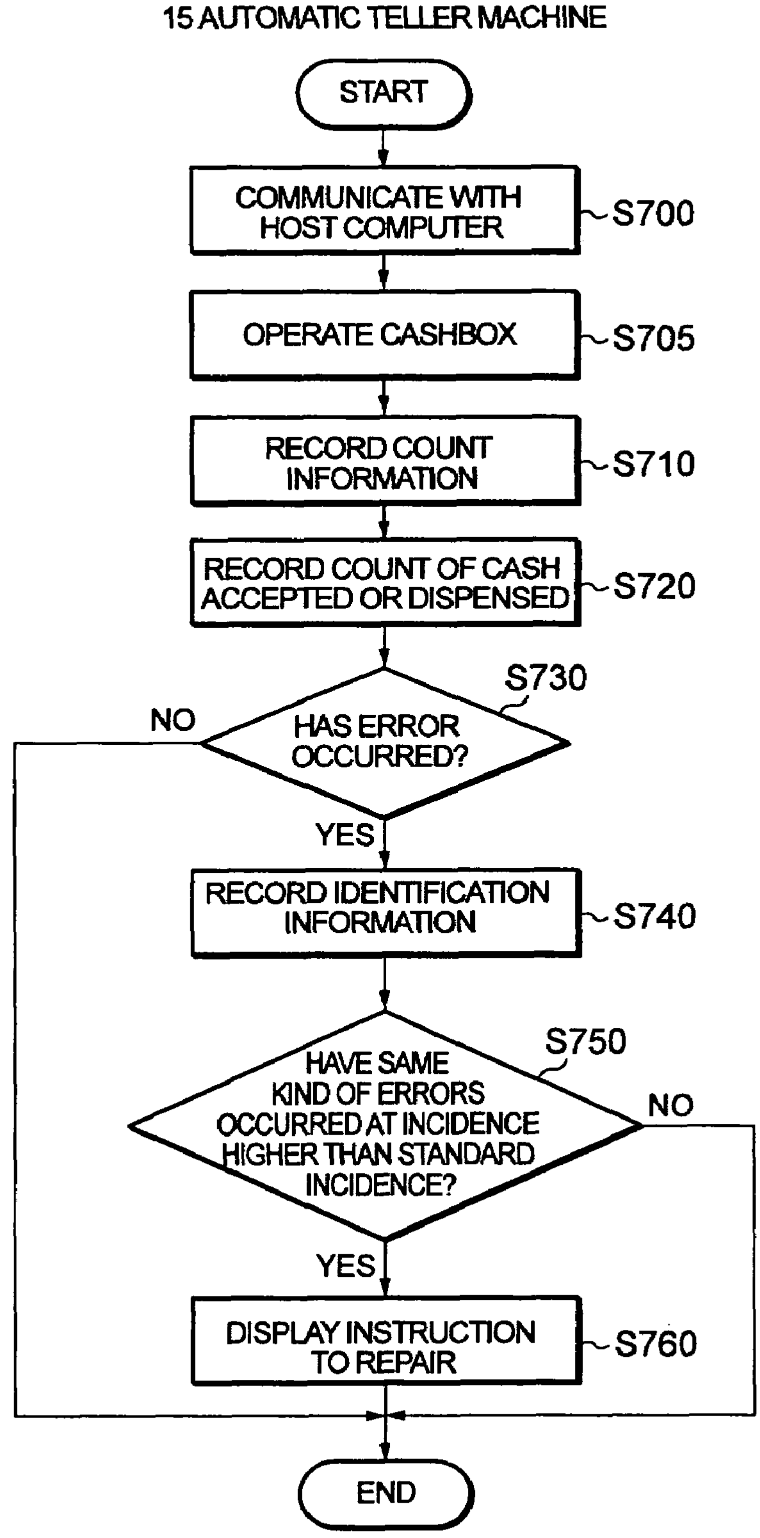
FIG. 8 shows a non-limiting example of an operation flowchart showing an example of processing for an automatic teller machine to operate a cash cassette, according to one embodiment of the present invention.

FIG. 8 is an operation flowchart showing an example of processing for the automatic teller machine 15 to operate the cash cassette 40. Each time the automatic teller machine 15 accepts data input from a user, it performs the processing. At first, the main body control unit 570 acquires information such as user's deposit balance from the host computer 25 in response to input from the user (S700). Then the main body control unit 570 sends an instruction to the cashbox controller 510 to enter or dispense bills or coins (S705). In this processing step, the main body control unit 570 may also instruct the card processing unit 575, the coin processing unit 580*m* or the receipt/journal printer unit 585 to perform various kinds of processing.

The count-information recording instruction unit 520 updates the count of cash in the cassette or in the reject bin recorded in the count information recording area 200 of the cash cassette 40 (step S710). At this time, it is preferable that the count-information recording instruction unit 520 encrypt the count of cash in the cassette or in the reject bin with cipher A, and record the encrypted information in the count information recording area 200 of the memory 60 in the cash cassette 40. Subsequently, the acceptance/dispensing count recording instruction unit 530 updates the count of cash entered, the count of cash dispensed, the total count of cash transacted, the total count of cash dispensed, or the total count of cash entered, recorded in the count information recording area of the cash cassette 40 (step S720). At this time, it is preferable that the acceptance/dispensing count recording instruction unit 530 record the count of cash entered and the count of cash dispensed in the form of data encrypted with cipher B different from the cipher A. On the other hand, the acceptance/dispensing count recording instruction unit 530 records the total count of cash transacted, the total count of cash dispensed, and the total count of cash accepted in the form of data encrypted with the cipher A.

The cashbox controller 510 detects an error in the cash cassette 40 based on a sensor signal or the like received from the sensor controller 290. When detecting the occurrence of an error (YES in step S730), the error-information recording instruction unit 540 records the identification information identifying the type of error (S740). Then, based on the identification information and the information on the date and time of occurrence acquired from the error information recording area 210, when determining that the same type of errors have occurred in the same cash cassette 40 at an incidence higher than the standard incidence predetermined for the kind (YES in step S750), the determination output unit 550 displays information indicating that the cash cassette 40 needs inspecting or repairing (S760). The determination output unit 550 may also record in the error information recording area 210 the information indicating that inspection or repair is needed.

Figure 9:
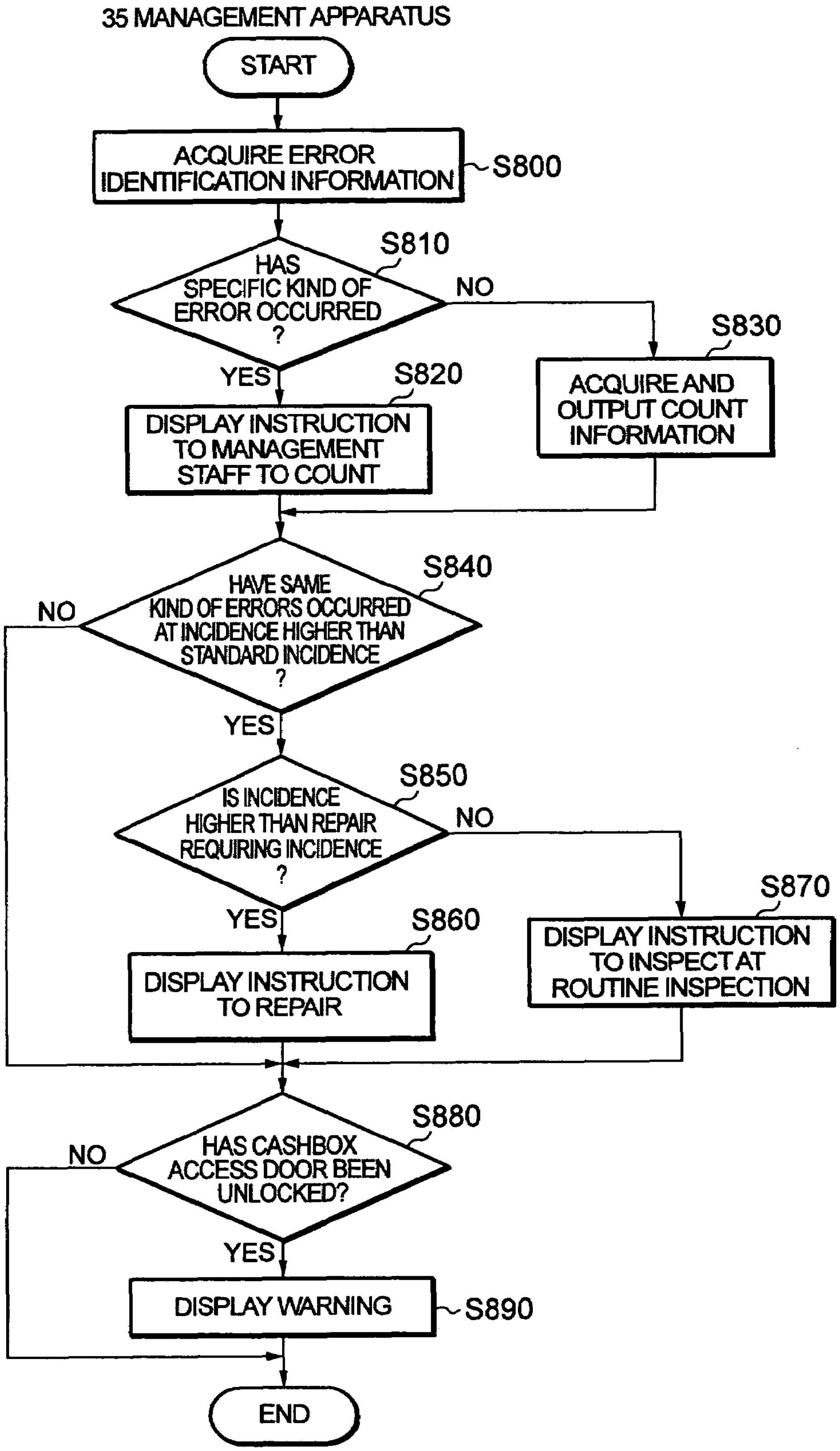
FIG. 9 shows a non-limiting example of an operation flowchart showing an example of processing for a management apparatus to manage a cash cassette, according to one embodiment of the present invention.

FIG. 9 is an operation flowchart showing an example of processing for the management apparatus 35 to manage the cash cassette 40. For example, the management apparatus 35 performs the processing each time the cash cassette 40 is attached thereto. The error determination unit 610 acquires the error identification information or the information on the date and time of occurrence of the error from the error information recording area 210 of the cash cassette (S800). Then, based on the identification information acquired, the error determination unit 610 determines whether the error is of the kind that could cause a difference between the count information in the count information recording area 200 and the number of bills or coins currently remaining in the cash cassette 40 (S810).

When determining that the error is of the kind that could cause a difference between the count information in the count information recording area 200 and the number of bills or coins currently remaining in the cash cassette 40 (YES in step S810), the count information output unit 620 displays an instruction on the display 650 that the management staff should count the number of bills or coins in the cash cassette 40 (S820). On the other hand, when determining that such a type of error has not occurred (NO in step S810), the count information output unit 620 acquires the count information from the count information recording area 200 and outputs it to the host computer 25 (S830).

Subsequently, when determining that the same type of errors have occurred in the cash cassette 40 at an incidence higher than the standard incidence predetermined for the kind (YES in step S840), the determination output unit 630 determines whether the same type of errors have occurred at an incidence higher than not only the standard incidence but also the repair requiring incidence predetermined for the kind (S850). When the determination output unit 630 determines that they have occurred at an incidence higher than the repair requiring incidence (YES in step S850), the display 650 shows an instruction that the cash cassette 40 should be repaired immediately (S860). In this case, the management apparatus 35 may also prohibit the management staff from filling bills or coins in the cash cassette 40 that have caused the errors at an incidence higher than the repair requiring incidence. On the other hand, when determining that the incidence of the same type of errors is higher than the standard incidence but lower than the repair requiring incidence (NO in step S850), the display 650 shows an instruction that the part that has caused the type of errors should be checked at the time of a routine inspection of the cash cassette 40 (S870).

Then, when determining, based on the information acquired from the open/close information recording area 230, that the access door to the cashbox 50 was unlocked during the period from the last attachment to the current attachment of the cash cassette 40 to the management apparatus 35 (YES in step S880), the warning unit 640 displays a warning on the display 650 to indicate that the lock of the cashbox access door was tampered with (S890).

As described above, according to the embodiment, the information processing system 100 records in the automatic teller machine 15 the information identifying the type of error occurred in the cash cassette 40, and at the same time, it records the information in the memory 60 provided in the cash cassette 40. The information on the error is displayed not only on the automatic teller machine 15, but also on the cash cassette 40. This makes is easy not only to inspect or repair the cash cassette 40, but also to carefully examine the number of bills or coins in the cash cassette 40.

Further, according to the embodiment, the information processing system 100 records in the automatic teller machine 15 the information indicating the number of bills or coins in the cash cassette 40 or the information relating to bills or coins entered into or dispensed from the cash cassette 40, and at the same time, it records the information in the memory 60 provided in the cash cassette 40. This makes is possible not only to efficiently verify that the number of bills or coins actually stored in the cash cassette 40 agrees with the past transaction records without collecting accepted/dispensed cash data from two or more automatic teller machines 15 in which the cash cassette 40 have been loaded before.

While the present invention has been described using the aforementioned embodiment, the technical scope of the present invention is not limited to that of the embodiment. It will be understood by those skilled in the art that various changes or modifications can be made without departing from the technical scope of the present invention described in the appended claims.

What is claimed is:

1. A management apparatus provided detachably from a cash cassette for managing the cash cassette storing bills or coins for cash transactions with users at an automatic teller machine, said cash cassette comprising:

an error information recording area for recording identification information identifying a type of error in the event of occurrence of the error, and a count information recording area for recording count information indicating the number of bills or coins expected to be in said cash cassette, said management apparatus comprising:

an error determination unit for determining, based on the identification information acquired from said error information recording area, whether the error occurred is of the kind that could cause a difference between the count information in said count information recording area and the number of bills or coins in said cash cassette; and a count information output unit, which outputs an instruction that management staff should count the number of bills or coins in said cash cassette on condition that said error determination unit determines that such a type of error has occurred, which acquires and outputs the count information from said count information recording area on condition that said error determination unit determines that such a type of error has not occurred.

2. A management apparatus according to claim 1, wherein:

said count information recording area holds information indicating the number of bills or the coins in the automatic teller machine or said cash cassette as the count information, said error determination unit determines whether there has occurred such an error that caused the automatic teller machine to remain jammed with one or more bills or coins drawn from said cash cassette or accepted from a user, as an error of the kind that could cause a difference between the count information and the number of bills or coins in said cash cassette, and on condition that said error determination unit determines that such an error has occurred, said count information output unit outputs an instruction to count the number of bills or coins that were jammed in the automatic teller machine separately from the number of bills or coins in said cash cassette.

3. A management apparatus according to claim 1, wherein said cash cassette further comprises an open/close information recording area for recording information indicating whether an access door through which bills or coins are stored in said cash cassette has been unlocked or not, and said management apparatus further comprises a warning unit for outputting a warning that the lock of the access door has been tampered with on condition of determining, based on the information acquired from said open/close information recording area, that the access door has been unlocked during the period from the last attachment until the current attachment of said management apparatus to said cash cassette.

4. A management apparatus according to claim 1 further comprising a determination output unit for outputting an instruction that said cash cassette should be inspected or repaired on condition of determining, based on the identification information acquired from said error information recording area, that errors of the same kind have occurred at an incidence higher than a standard incidence predetermined for the kind.

5. A management apparatus according to claim 4, wherein on condition of determining that the same type of errors have occurred at an incidence higher than not only the standard incidence but also a repair requiring incidence predetermined for the kind, said determination output unit outputs an instruction that said cash cassette should be repaired immediately, or on condition of determining that the incidence of the same type of errors is higher than the standard incidence but lower than the repair requiring incidence, said determination output unit outputs an instruction that the part that has caused the type of errors should be checked at the time of a routine inspection of said cash cassette.

6. A management apparatus according to claim 4, wherein said cash cassette further comprises an impact detector for detecting an impact applied to said cash cassette, and said determination output unit further outputs information indicating that said impact detector has detected the impact to said cash cassette, in association with the instruction that said cash cassette should be inspected or repaired.

7. An information processing system including an automatic teller machine, a removable cash cassette provided in the automatic teller machine for storing bills or coins for cash transactions with users at the automatic teller machine, and a management apparatus provided detachably from the cash cassette for managing the cash cassette, said cash cassette comprising:

an error information recording area for recording an identification information identifying a type of error in the event of occurrence of the error, a count information recording area for recording count information indicating the number of bills or coins expected to be in said cash cassette, said automatic teller machine comprising an error information recording instruction unit for recording, in said error information recording area, the identification information identifying the type of error in the event of occurrence of the error in said cash cassette, said management apparatus comprises:

an error determination unit for determining, based on the identification information acquired from said error information recording area, whether the error occurred is of the kind that could cause a difference between the count information recorded in said count information recording area and the number of bills or coins in said cash cassette; and a count information output unit, which outputs an instruction to management staff to count the number of bills or coins in said cash cassette on condition that said error determination unit determines that such a type of error has occurred, which acquires and outputs the count information from said count information recording area on condition that said error determination unit determines that such a type of error has not occurred.

8. A management method for managing a removable cash cassette for storing bills or coins for cash transactions with users at an automatic teller machine, the cash cassette including an error information recording area for recording identification information identifying a type of error in the event of occurrence of the error, a count information recording area for recording count information indicating the number of bills or coins expected to be in the cash cassette, said management method comprising:

an error determination step of determining, based on the identification information acquired from the error information recording area, whether the error occurred is of the kind that could cause a difference between the count information in the count information recording area and the number of bills or coins in the cash cassette; and a count information output step of outputting an instruction that management staff should count the number of bills or coins in the cash cassette on condition that it is determined in said error determination step that such a type of error has occurred, of acquiring and outputting the count information from the count information recording area on condition that it is determined in said error determination step that such a type of error has not occurred.

* * * * *